(12) United States Patent
Stevens

(10) Patent No.: US 7,726,241 B2
(45) Date of Patent: *Jun. 1, 2010

(54) MICRO GAS GENERATOR

(75) Inventor: Bruce A. Stevens, Oakland, MI (US)

(73) Assignee: TK Holdings, Inc., Armada, MI (US)

(*) Notice: Subject to any disclaimer, the term of this patent is extended or adjusted under 35 U.S.C. 154(b) by 43 days.

This patent is subject to a terminal disclaimer.

(21) Appl. No.: 11/593,707

(22) Filed: Nov. 1, 2006

(65) Prior Publication Data

US 2007/0096451 A1 May 3, 2007

Related U.S. Application Data

(60) Provisional application No. 60/733,291, filed on Nov. 3, 2005, provisional application No. 60/734,180, filed on Nov. 5, 2005.

(51) Int. Cl.
*F42B 3/10* (2006.01)

(52) U.S. Cl. .............. 102/202.12; 102/202.5; 102/202.9; 102/202.14

(58) Field of Classification Search ......... 102/530–531, 102/202.5, 202.9, 202.12, 202.14; 280/728.1, 280/730.1–730.2, 733, 741
See application file for complete search history.

(56) References Cited

U.S. PATENT DOCUMENTS

| | | | | |
|---|---|---|---|---|
| 5,648,634 A * | 7/1997 | Avory et al. | ............. | 102/202.1 |
| 6,009,809 A * | 1/2000 | Whang | ............. | 102/202.7 |
| 6,168,202 B1 * | 1/2001 | Stevens | ............. | 280/737 |
| 6,419,177 B2 * | 7/2002 | Stevens | ............. | 242/374 |
| 6,460,794 B1 * | 10/2002 | Stevens | ............. | 242/374 |
| 6,505,790 B2 * | 1/2003 | Stevens | ............. | 242/374 |
| 6,520,443 B2 * | 2/2003 | Stevens | ............. | 242/374 |
| 6,789,485 B2 * | 9/2004 | Moquin et al. | ............. | 102/530 |
| 7,097,203 B2 * | 8/2006 | Burns et al. | ............. | 280/741 |
| 7,192,055 B2 * | 3/2007 | Stevens et al. | ............. | 280/741 |
| 7,243,946 B2 * | 7/2007 | Stevens et al. | ............. | 280/741 |

(Continued)

OTHER PUBLICATIONS

Office Action for U.S. Appl. No. 11/646,633, filed Dec. 28, 2006.

(Continued)

*Primary Examiner*—Michael Carone
*Assistant Examiner*—Michael D David
(74) *Attorney, Agent, or Firm*—L.C. Begin & Associates, PLLC

(57) ABSTRACT

A gas generator usable in a vehicle occupant protection system. The gas generator includes an initiator holder and an initiator secured within the holder, the initiator including a housing enclosing an initiator charge. A bore seal is molded into the initiator holder, and a casing is attached to the bore seal along an exterior surface of the bore seal. A gas generant material is positioned within the casing so as to enable fluid communication between the gas generant and combustion products formed by combustion of the initiator charge, thereby enabling ignition of the gas generant. In one embodiment, an edge portion of the casing is pre-formed so as to snap-fit over a shoulder formed along the bore seal. In another embodiment, an edge portion of the casing is crimped onto outer surfaces of the bore seal. In yet another embodiment, the casing is welded to the bore seal.

16 Claims, 3 Drawing Sheets

U.S. PATENT DOCUMENTS

| | | | |
|---|---|---|---|
| 7,370,885 B2* | 5/2008 | Stevens | 280/741 |
| 2002/0079680 A1* | 6/2002 | Moquin et al. | 280/736 |
| 2005/0017496 A1* | 1/2005 | Stevens et al. | 280/806 |
| 2005/0156075 A1* | 7/2005 | Stevens et al. | 242/382 |
| 2005/0189740 A1* | 9/2005 | Stevens | 280/728.2 |
| 2005/0189747 A1* | 9/2005 | Khandhadia et al. | 280/730.2 |
| 2005/0200103 A1* | 9/2005 | Burns et al. | 280/730.2 |
| 2005/0235863 A1* | 10/2005 | Stevens | 102/531 |
| 2006/0022443 A1* | 2/2006 | Stevens et al. | 280/736 |
| 2006/0033317 A1* | 2/2006 | Stevens | 280/741 |
| 2006/0097506 A1* | 5/2006 | Stevens | 280/806 |
| 2006/0131866 A1* | 6/2006 | Stevens et al. | 280/806 |
| 2006/0163864 A1* | 7/2006 | Dunham et al. | 280/806 |
| 2006/0219340 A1* | 10/2006 | Dunham et al. | 149/19.7 |
| 2007/0085318 A1* | 4/2007 | Stevens | 280/806 |
| 2007/0096451 A1* | 5/2007 | Stevens | 280/806 |
| 2007/0145732 A1* | 6/2007 | Stevens | 280/806 |
| 2007/0193465 A1* | 8/2007 | Stevens | 102/202.1 |
| 2007/0228013 A1* | 10/2007 | Stevens et al. | 218/1 |

OTHER PUBLICATIONS

U.S. Appl. No. 11/593,707, filed Nov. 1, 2006, Bruce A. Stevens.
U.S. Appl. No. 11/646,633, filed Dec. 28, 2006, Bruce A. Stevens.
Office Action U.S. Appl. No. 11/646,633, filed Dec. 28, 2006; Dated for Sep. 23, 2008.
Office Action U.S. Appl. No. 11/646,633, filed Dec. 28, 2006, Dated for Mar. 30, 2009.
Office Action U.S. Appl. No. 11/646,633, filed Dec. 28, 2006, Dated for Oct. 15, 2009.

* cited by examiner

MICRO GAS GENERATOR

CROSS-REFERENCE TO RELATED APPLICATIONS

This application claims the benefit of U.S. Provisional Application Ser. Nos. 60/733,291 filed on Nov. 3, 2005 and 60/734,180 filed on Nov. 5, 2005.

BACKGROUND OF THE INVENTION

The present invention relates generally to gas generating systems and, more particularly, to gas generators used in vehicle occupant protection systems and related components, such as seatbelt pretensioners.

Gas generators used in seatbelt pretensioners are known as micro gas generators due to the relatively small size of the gas generator. Exemplary pretensioners using such micro gas generators include those described in U.S. Pat. Nos. 6,460,794, 6,505,790, 6,520,443, and 6,419,177, incorporated herein by reference. Micro gas generators generally include an initiator holder for receiving and securing an initiator therein, an initiator including an initiator charge, and a gas generant composition which ignites and burns in response to ignition of the initiator to produce gases for actuating the seatbelt pretensioner.

In addition, conventional micro gas generator designs usually incorporate a casing secured to the initiator holder for containing the gas generant therein and for positioning the gas generant in proximity to the initiator. The casing is secured to the initiator holder by crimping, using deformable crimp tabs machined into the structure of either the holder, or onto the structure of a bore seal affixed to the holder. An O-ring or some other type of compressive seal may also be required to seal the interface between the casing and the initiator holder.

Machining of the crimp tabs along the holder and machining of surfaces along the bore seal for use in securing the casing therealong increase the manufacturing complexity and cost of the initiator holder and bore seal. In addition, existing conventional micro gas generator designs may provide a relatively small bearing surface area along the holder and/or bore seal for use in supporting and securing the bore seal within a pretensioner housing.

DETAILED DESCRIPTION

Figure 1:
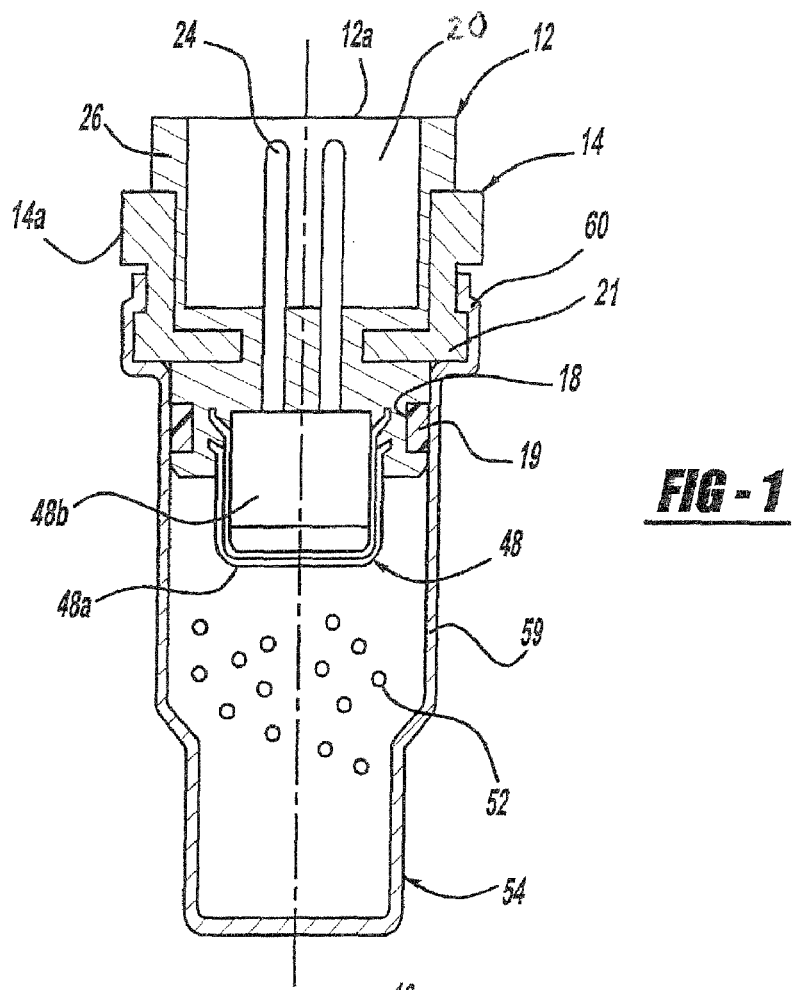
FIG. 1 is a cross-sectional side view of a micro gas generator in accordance with a first embodiment of the present invention.
Figure 2:
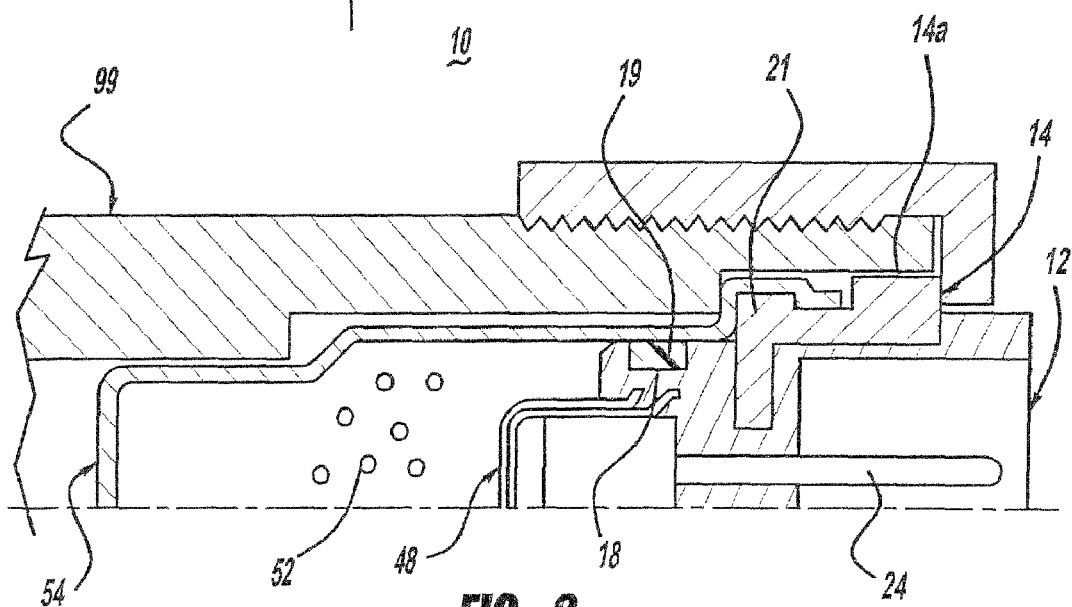
FIG. 2 is a partial cross-sectional side view of the micro gas generator of FIG. 1 secured within a pretensioner assembly for a safety belt.
Figure 5:
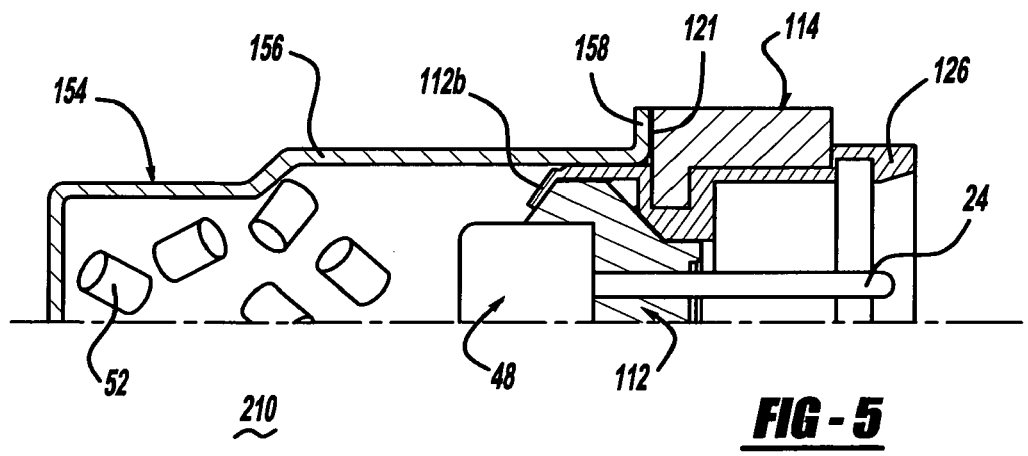
FIG. 5 is a partial cross-sectional side view of a micro gas generator in accordance with a fourth embodiment of the present invention.

FIG. 1 shows a micro gas generator 10 in accordance with the present invention incorporating an insert molded initiator holder 12. FIG. 2 shows the gas generator of FIG. 1 secured in a housing 99 of a safety belt pretensioner assembly. Referring to FIGS. 1, 2, and 5, holder 12 has a conventional initiator 48 secured therein using any one of several known methods. For example, initiator 48 may be insert molded into holder 12, or the initiator may be secured in a cavity formed in holder 12 using a suitable adhesive. In a particular embodiment, shown in FIG. 5, initiator 48 is secured in an initiator holder 112 using a crimped portion 112b. Other securement methods are also contemplated. Initiator 48 includes a housing 48a enclosing an initiator charge 48b for igniting a gas generant composition contained in the gas generator. One exemplary initiator construction is described in U.S. Pat. No. 6,009,809, incorporated herein by reference.

An annular bore seal 14 is insert-molded into holder 12. Referring to FIGS. 1 and 2, in a particular embodiment, an annular groove 18 is also molded into an outer surface of holder 12 for receiving therein a gasket 19, such as an O-ring. Gasket or O-ring 19 is used to form a substantially gas-tight compressive seal between a casing 54 (described below) and holder 12. When gasket 19 is secured to bore seal 14, casing 54 compresses gasket 19 into groove 18, thereby forming a seal between casing 54 and holder 12. Alternatively, a sealant (for example, a suitable epoxy) may be applied at the casing-bore seal interface to effect the desired seal.

Referring again to FIG. 1, initiator 48 has a pair of axially-extending electrodes 24 projecting therefrom. Holder 12 has an annular wall 26 which defines a cylindrical cavity 20 housing initiator electrodes 24. An end portion 12a of holder 12 is configured to provide an interface mateable with a complementary connector (not shown) of a wiring harness or other suitable initiator activation signal transmission medium. Holder 12 is formed from a moldable material, for example a castable metal alloy or a suitable polymer material. Where holder 12 is formed from a polymer material, electrodes 24 may be insert-molded into the body of holder 12. In cases where the holder is formed from a conductive material, such as a metal, portions of electrodes 24 extending through holder 12 may be covered with a suitable insulating material to prevent electrical shorting.

Referring to FIG. 1, bore seal 14 has an outer surface formed to engage a wall of casing 54, as described in greater detail below. Bore seal 14 is formed from a metal or metal alloy, such as aluminum or steel, using a suitable process, such as casting or machining. Bore seal 14 is also configured according to the needs of a particular application to engage, for example, a portion of a vehicle (such as a housing of a seatbelt pretensioner assembly as shown in FIG. 2), thereby securing the gas generator to the vehicle. In the embodiments shown herein, a portion 14a of bore seal 14 extends between an end of initiator holder 12 and the portion of the bore seal to which casing 54 (described below) is attached. This exposed portion of bore seal 14 is usable for engaging a portion of the pretensioner housing to secure the gas generator to the housing. Engagement between bore seal 14 and the pretensioner housing provides a substantially gas-tight seal which prevents generated gases from escaping from the portion of the pretensioner housing in which the gas generator is mounted.

Referring again to FIGS. 1 and 2, casing 54 is provided for containing a gas generant 52 therein. Casing 54 is formed from a metal or metal alloy using a suitable manufacturing process, such as drawing. Casing 54 is secured to bore seal 14 using any of a variety of methods. In the embodiment shown in FIGS. 1 and 2, casing 54 has a wall 59 including a circumferential edge portion 60 formed to complementarily engage a shoulder 21 of bore seal 14 when the casing is secured to holder 12. In this embodiment, edge portion 60 may be preformed, and casing 54 may be snap-fit over shoulder 21 to engage the shoulder. Shoulder 21 may extend along an outer surface of holder 12 at any desired position along the length of the holder. Alternatively, edge portion 60 may be formed by side-crimping a portion of the casing to grip outer surfaces of the bore seal along and/or proximate shoulder 21.

Figure 3:
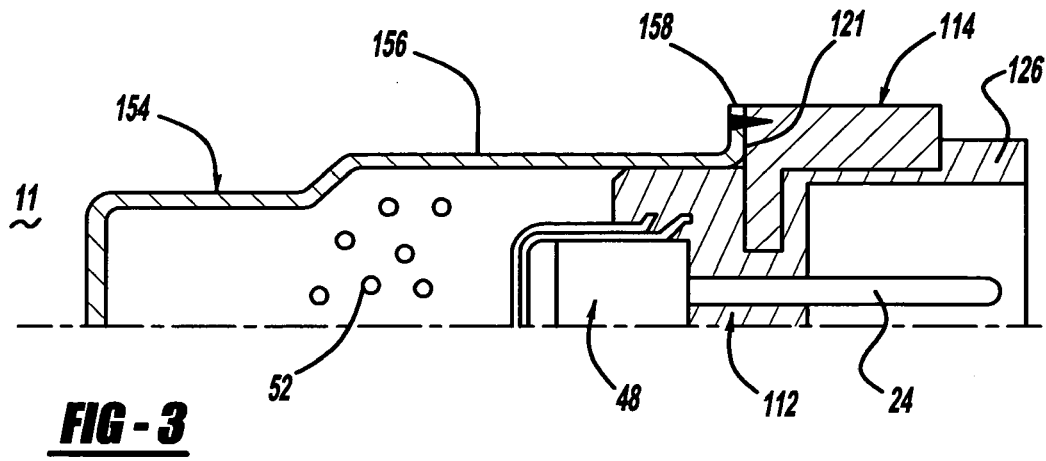
FIG. 3 is a partial cross-sectional side view of a micro gas generator in accordance with a second embodiment of the present invention.
Figure 4:
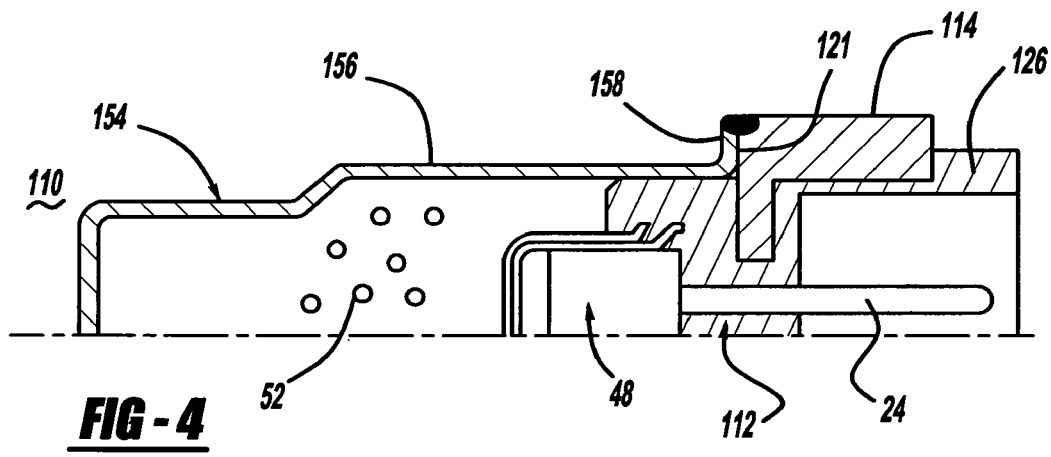
FIG. 4 is a partial cross-sectional side view of a micro gas generator in accordance with a third embodiment of the present invention.

In other embodiments 11, 110 of the gas generator, shown in FIGS. 3 and 4, casing 154 is secured to bore seal 114 by welding. In FIGS. 3 and 4, elements similar to those in FIGS. 1 and 2 have been given similar reference numerals. In the embodiments shown in FIGS. 3 and 4, casing 154 has a body portion including an annular wall 156 and a circumferential, outwardly extending lip 158 formed along the edge of the wall for weldably engaging a portion of bore seal shoulder 121. Casing lip 158 may be welded to bore seal 114 using any of a wide variety of welding processes. Suitable welding processes include (but are not limited to) laser welding, MAG (Metal Active Gas) welding, MIG (Metal Inert Gas) welding, resistance welding (including projection welding), stick welding, and TIG (Tungsten Inactive Gas) welding. The design of the portions of casing 154 and bore seal 114 forming the interface between the two parts may depend on the type of welding to be used in joining the parts. Conversely, the welding process used to join casing 154 to holder 112 may be selected based on a particular desired joint or interface design. Any of a variety of different types of welds (for example, spot welds (FIG. 3), groove welds (FIG. 4), or other types of welds) may be used according to the requirements of a particular application. Casing 154 may alternatively be secured to bore seal 114 using other methods (for example, adhesive application, as seen in FIG. 5).

Referring again to FIG. 1, gas generant 52 is positioned within an interior of casing 54. Generally, the gas generant composition is a fast burning, relatively easily ignitable composition. In one embodiment, the gas generant comprises silicone as a fuel at about 10-25% by weight; a perchlorate oxidizer such as ammonium, lithium, or potassium perchlorate; and a strontium salt such as strontium nitrate or strontium carbonate as a coolant. The oxidizer and coolant typically comprise about 75-90% by weight of the gas generant. The silicone may be purchased, for example, from General Electric or other well-known suppliers. Silicone provides the additional benefit of acting as a binder, facilitating the formation of the cylindrical shape described herein. The other gas generant constituents may be provided by suppliers or by manufacturing methods well known in the art. Exemplary suitable compositions are disclosed in United States Patent Application Publication No. 2001/0045735, Ser. No. 09/846,004, incorporated by reference herein.

Operation of the gas generator will now be discussed with reference to FIG. 1. Upon a crash event, a signal from a crash sensor (not shown) is conveyed to initiator 48, thereby activating the initiator and generating flame and ignition products. The flame and ignition products propagate outwardly from initiator 48 to ignite gas generant 52 which combusts to produce gases for actuating the pretensioner. Gas pressure resulting from ignition of gas generant composition 52 causes casing 54 to rupture, thereby releasing the gases which are then channeled into the pretensioner mechanism.

Molding bore seal 14 into initiator holder 12 obviates the need to machine or otherwise form crimp members along the bore seal (or initiator holder) for crimping the casing to the bore seal (or initiator holder). Thus, fabrication of the bore seal is simpler and less-expensive than in previous designs. Molding both the bore seal and the initiator into the initiator holder also maximizes the strength of the structural connection between the bore seal and the initiator. Also, an exposed portion shoulder or bearing feature 14a (see FIG. 2) having a relatively large surface area may be formed along an exterior surface of bore seal 14 for use as a bearing surface for positioning and securing the initiator holder-bore seal assembly within a safety belt pretensioner housing or other portion of a vehicle. Provision of a bore seal having a relatively larger bearing surface area enables more effective retention of the holder-bore seal assembly in position within the pretensioner.

Figure 6:
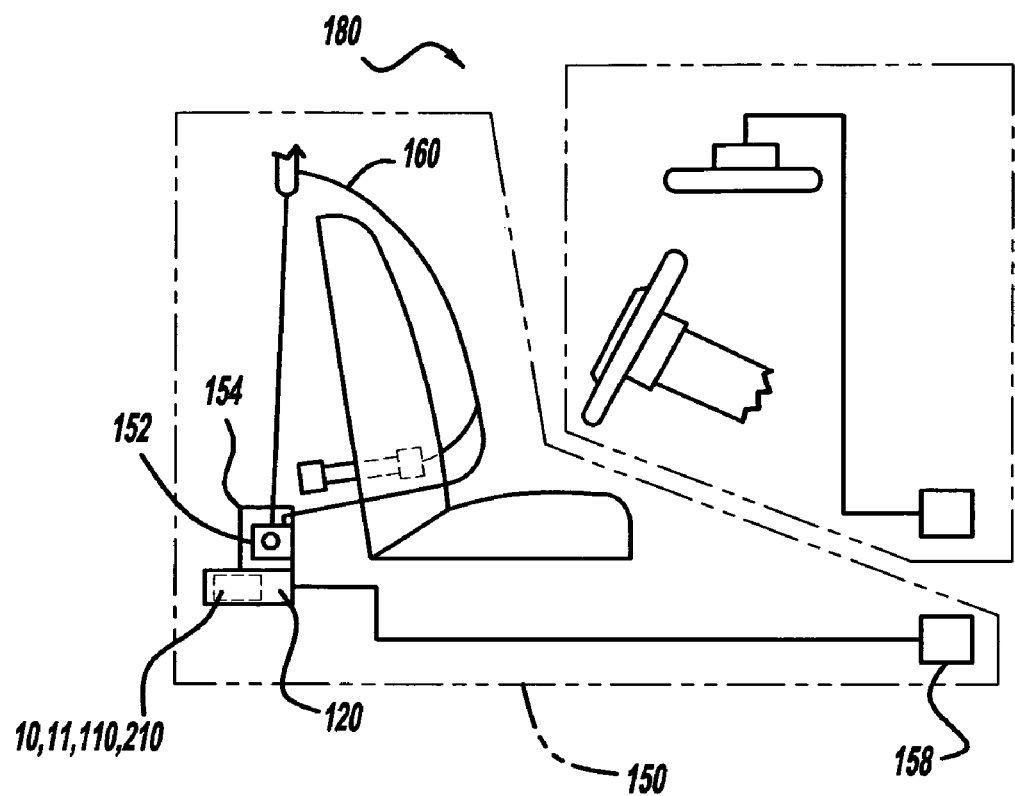
FIG. 6 is a schematic representation of an exemplary vehicle occupant protection system incorporating a micro gas generator in accordance with the present invention.

Referring to FIG. 6, in a particular application, a micro gas generator 10, 11, 110, 210 as described herein is incorporated into a safety belt pretensioner 120 employed in a safety belt assembly 150 used in a vehicle occupant protection system 180. Safety belt assembly 150 includes a safety belt housing 152 and a safety belt 160 extending from housing 152. A safety belt retractor mechanism 154 (for example, a spring-loaded mechanism) may be coupled to an end portion of the belt. Safety belt pretensioner 120 may be coupled to belt retractor mechanism 154 to actuate the retractor mechanism in the event of a collision. Gas generator 10, 11, 110, 210 is adapted to actuate seat belt retractor mechanism 154 to pretension safety belt 160. Typical seat belt retractor mechanisms which may be used in conjunction with safety belt 160 are described in U.S. Pat. Nos. 5,743,480, 5,553,803, 5,667, 161, 5,451,008, 4,558,832 and 4,597,546, incorporated herein by reference. Safety belt assembly 150 may be in communication with a known crash event sensor 158 (for example, an inertia sensor or an accelerometer) that is in operative communication with a known crash sensor algorithm (not shown) which signals actuation of belt pretensioner 120 via, for example, activation of initiator 48 (not shown in FIG. 3) in gas generator 10, 11, 110, 210. U.S. Pat. Nos. 6,505,790 and 6,419,177 provide illustrative examples of pretensioners actuated in such a manner.

Unless otherwise noted, elements of the pretensioner may be fabricated using methods known in the art. In addition, a gas generator as described herein may be incorporated into any of a wide variety of alternative pretensioner designs.

It will be understood that the embodiments of the micro gas generator described herein are not limited to use in seatbelt pretensioners, but may also be used in other applications in which a compact gas generating mechanism is required.

It will be understood that the foregoing description of the present invention is for illustrative purposes only, and that the various structural and operational features herein disclosed are susceptible to a number of modifications, none of which departs from the spirit and scope of the present invention. The preceding description, therefore, is not meant to limit the scope of the invention. Rather, the scope of the invention is to be determined only by the appended claims and their equivalents.

What is claimed is:

1. A gas generator comprising:
   an initiator holder;
   an initiator secured in the initiator holder, the initiator including a housing enclosing an initiator charge;
   a metallic bore seal molded to the initiator holder;
   a casing attached to and abutting the bore seal; and a gas generant positioned within the casing so as to enable fluid communication between the gas generant and combustion products formed by combustion of the initiator charge, thereby enabling ignition of the gas generant 2. The gas generator of claim 1 further comprising a compressive, substantially fluid-tight seal formed between the casing and initiator holder, the seal being positioned along the initiator holder between the gas generant and the bore seal.

3. The gas generator of claim 2 wherein the initiator holder includes a groove with a gasket received in the groove to form the compressive seal.

4. The gas generator of claim 3 wherein the gasket comprises an O-ring.

5. The gas generator of claim 1 wherein a portion of the initiator holder defines an interface mateable with a complementary interface of an initiator activation signal transmission medium.

6. The gas generator of claim 1 wherein the initiator holder is formed from a moldable metal alloy.

7. The gas generator of claim 1 wherein the initiator holder is formed from a polymer material.

8. The gas generator of claim 1 wherein the casing is crimped over a portion of the bore seal.

9. The gas generator of claim 1 wherein the casing is snap-fit over a portion of the bore seal.

10. The gas generator of claim 1 wherein a portion of the bore seal resides between an end of the initiator holder and the portion of the bore seal to which the casing is attached, for engaging a portion of a vehicle to secure the gas generator to the vehicle.

11. A vehicle occupant protection system including a gas generator according to claim 1.

12. A seatbelt pretensioner including a gas generator according to claim 1.

13. The gas generator of claim 1 wherein the casing is welded to the bore seal

14. The gas generator of claim 1 wherein the casing is attached to the bore seal using an adhesive.

15. The gas generator of claim 1 wherein the initiator is secured in the initiator holder using an adhesive.

16. The gas generator of claim 1 wherein the initiator is secured in the initiator holder using a crimp.

* * * * *

UNITED STATES PATENT AND TRADEMARK OFFICE
CERTIFICATE OF CORRECTION

PATENT NO. : 7,726,241 B2   Page 1 of 1
APPLICATION NO. : 11/593707
DATED : June 1, 2010
INVENTOR(S) : Stevens It is certified that error appears in the above-identified patent and that said Letters Patent is hereby corrected as shown below:

Column 1; Line 26; delete "bums" and insert --burns--
Column 2; Line 36; delete "20" and insert --19--
Column 5; Claim 2; line 6; delete "fight" and insert --tight--

Signed and Sealed this

Sixteenth Day of November, 2010

David J. Kappos
*Director of the United States Patent and Trademark Office*